(12) United States Patent
Kimura

(10) Patent No.: US 7,742,014 B2
(45) Date of Patent: Jun. 22, 2010

(54) TASK LIGHT

(75) Inventor: Masao Kimura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 620 days.

(21) Appl. No.: 10/596,927

(22) PCT Filed: Jan. 17, 2005

(86) PCT No.: PCT/JP2005/000495

§ 371 (c)(1),
(2), (4) Date: Jun. 29, 2006

(87) PCT Pub. No.: WO2005/069103

PCT Pub. Date: Jul. 28, 2005

(65) Prior Publication Data

US 2007/0210986 A1     Sep. 13, 2007

(30) Foreign Application Priority Data

Jan. 16, 2004     (JP) ............................... 2004-009224

(51) Int. Cl.
*G09G 5/00* (2006.01)
(52) U.S. Cl. ............................. 345/48; 362/85; 362/33; 345/87
(58) Field of Classification Search ............. 362/85, 362/33, 368, 109, 227, 113, 140, 170, 552–582, 362/642; 345/48, 3, 4, 87, 102, 156, 168
See application file for complete search history.

(56) References Cited

U.S. PATENT DOCUMENTS 5,057,024 A * 10/1991 Sprott et al. ............... 434/146
5,077,551 A * 12/1991 Saitou ....................... 345/207

(Continued)

FOREIGN PATENT DOCUMENTS

JP        10-340134       12/1998

(Continued)

OTHER PUBLICATIONS

Microfilm of the specification and drawings annexed to the request of Japanese Utility Model Application No. 182626/1985 (Laid-open No. 93225/1987) (Masanaka Adachi) Jun. 15, 1987.

*Primary Examiner*—Amare Mengistu
*Assistant Examiner*—Hong Zhou
(74) *Attorney, Agent, or Firm*—Pearne & Gordon LLP

(57) ABSTRACT

A technology for illuminating almost an entire console with a simple structure, even when a display is located at the right or left of the center of the console is disclosed. According to this technology, when a display 1 is located at the center of a console 2, a detection signal of a sensor S1 is turned ON, a light L1 in the center of the display is lit, and the light illuminates the entire console. In addition, when the display is located at the right of the console, the detection signal of the sensor S2 is turned ON, the light L2 on the left-side of the display is lit, and the light can illuminate the entire console. In addition, when the display is located at the left of the console, the detection signal of the sensor S3 is turned ON, the light L3 on the right-side of the display is lit, and the light can illuminate the entire console.

5 Claims, 9 Drawing Sheets

U.S. PATENT DOCUMENTS

| | | | |
|---|---|---|---|
| 5,379,201 A * | 1/1995 | Friedman | 362/191 |
| 5,868,487 A * | 2/1999 | Polley et al. | 362/33 |
| 6,089,724 A * | 7/2000 | Shore et al. | 362/85 |
| 6,145,992 A * | 11/2000 | Wattenburg | 362/85 |
| 6,561,668 B2 * | 5/2003 | Katayama et al. | 362/85 |
| 6,776,497 B1 * | 8/2004 | Huppi et al. | 362/85 |
| 2002/0064055 A1 * | 5/2002 | Takahashi et al. | 362/555 |
| 2003/0006958 A1 * | 1/2003 | Onodera | 345/156 |
| 2003/0133261 A1 * | 7/2003 | Minaguchi et al. | 361/681 |
| 2004/0133817 A1 * | 7/2004 | Choi | 713/300 |
| 2005/0047073 A1 * | 3/2005 | Lo | 361/683 |

FOREIGN PATENT DOCUMENTS

| | | |
|---|---|---|
| JP | 11-161367 | 1/1999 |
| JP | 2001-22470 | 1/2001 |
| JP | 2002-510134 | 4/2002 |
| WO | WO 99/50591 | 10/1999 |

* cited by examiner

TASK LIGHT

TECHNICAL FIELD

The present invention relates to a task light for equipment of which a display is rotatable to a console.

BACKGROUND ART

Because, for example, an ultrasonic diagnostic apparatus, among various equipments, is used in a dimly lit environment, a method of illuminating a pictogram on a console from within the console or providing a task light on the display that illuminates the console, to facilitate visibility of the console, and in particular, the pictogram that expresses the functions of the operation keys on the console in a dimly lit environment, is known. In addition, as a conventional example of the task light, for example, there is the invention disclosed in Patent Document 1, below. Patent Document 1: Japanese Patent Application Publication (PCT) No. 2002-510134 (Abstract of the Disclosure)

However, generally, when an operator such as a doctor uses equipment such as an ultrasonic diagnostic apparatus, the operator images a tomographic image by pressing a probe onto a subject site, displays the image on a display, and at this time, shows the examinee the displayed image. Therefore, the display is rotatable to the console. This is problematic in that, the task light cannot illuminate the entire console by merely providing a task light on the display to illuminate the console, when the display is located at the right or left of the center of the console. In addition, in the method in which a pictogram on the surface of the console is illuminated from within the console, this is problematic in that the internal structure of the console becomes complicated.

DISCLOSURE OF THE INVENTION

The present invention has been made in light of the foregoing issues. An object of the present invention is to provide a task light with a simple structure that can illuminate almost the entire console, even when the display is located at the right or left of the center of the console.

In order to achieve the foregoing object, the present invention comprises plural illumination means aligned in the horizontal direction on a display that is rotatable with respect to a console;

a detection means for detecting a rotational position of the display with respect to the console; and a lighting means for selectively lighting at least one of plural illumination means so as to illuminate approximately the entire console, based on the rotational position of the display detected by the detection means.

This configuration allows almost the entire console to be illuminated by at least one of plural illumination means with a simple structure, even when the display is located at the left or right of the center of the console.

In addition, in order to achieve the foregoing object, the present invention comprises rotatable illumination means provided approximately at the center in the horizontal direction on a display that is rotatable with respect to a console; and a rotating means for rotating the illumination means so as to illuminate approximately the entire console, based on the rotational position of the display with respect to the console detected by the detection means.

This configuration allows almost the entire console to be illuminated by at least one illumination means with a simple structure, even when the display is located at the left or right of the center of the console.

According to the present invention, almost the entire console can be illuminated, even when the display is located at the left or right of the center of the console.

BEST MODE OF CARRYING OUT THE INVENTION

Hereinafter, the embodiments of the present invention are described with reference to the drawings.

First Embodiment

Figure 1A:
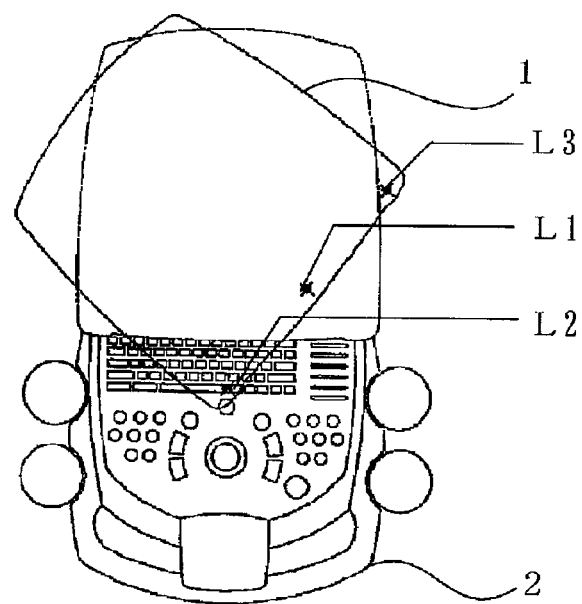
FIG. 1A is a planar view of a first embodiment of a task light according to the present invention, showing a state where a display is rotated to the right of a console.
Figure 1B:
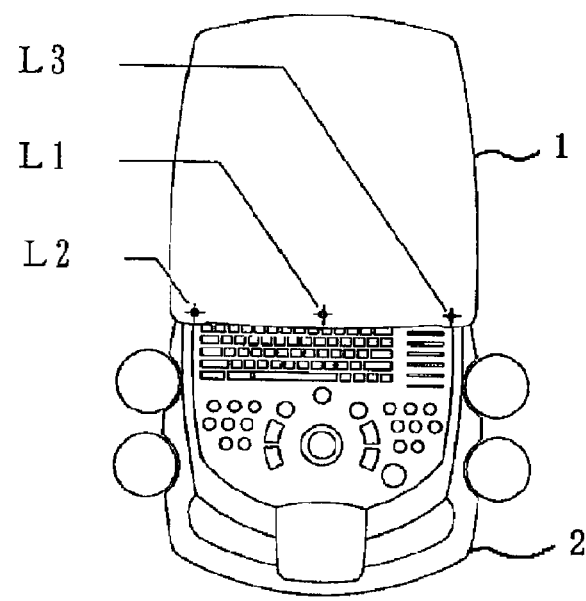
FIG. 1B is a planar view of the first embodiment of the task light according to the present invention, showing a state where the display is rotated to the center of the console.
Figure 1C:
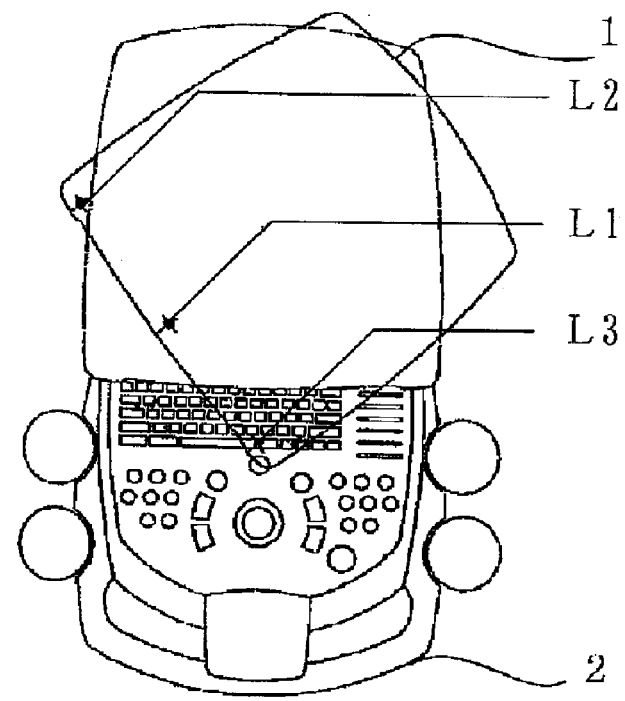
FIG. 1C is a planar view of the first embodiment of the task light according to the present invention, showing a state where the display is rotated to the left of the console.
Figure 2A:
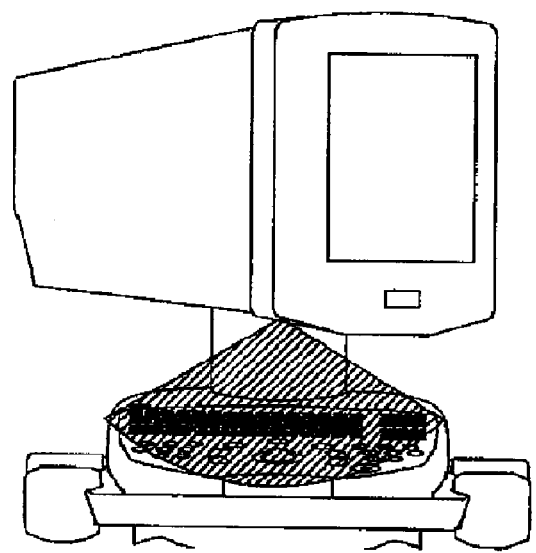
FIG. 2A is a front elevation view of the first embodiment of the task light according to the present invention, showing a state where the display is rotated to the right of the console.
Figure 2B:
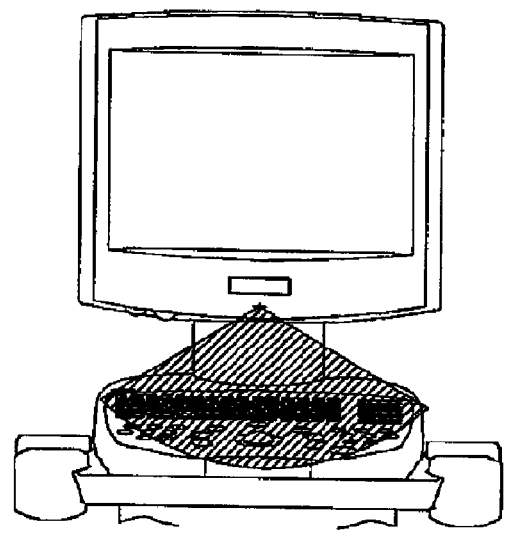
FIG. 2B is a front elevation view of the first embodiment of the task light according to the present invention, showing a state where the display is rotated to the center of the console.
Figure 2C:
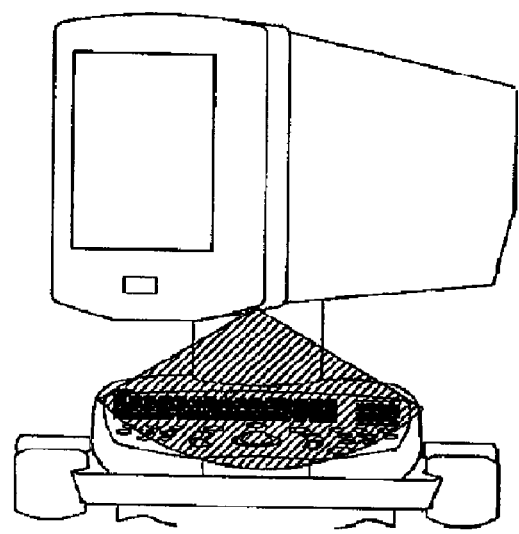
FIG. 2C is a front elevation view of the first embodiment of the task light according to the present invention, showing a state where the display is rotated to the left of the console.
Figure 3:
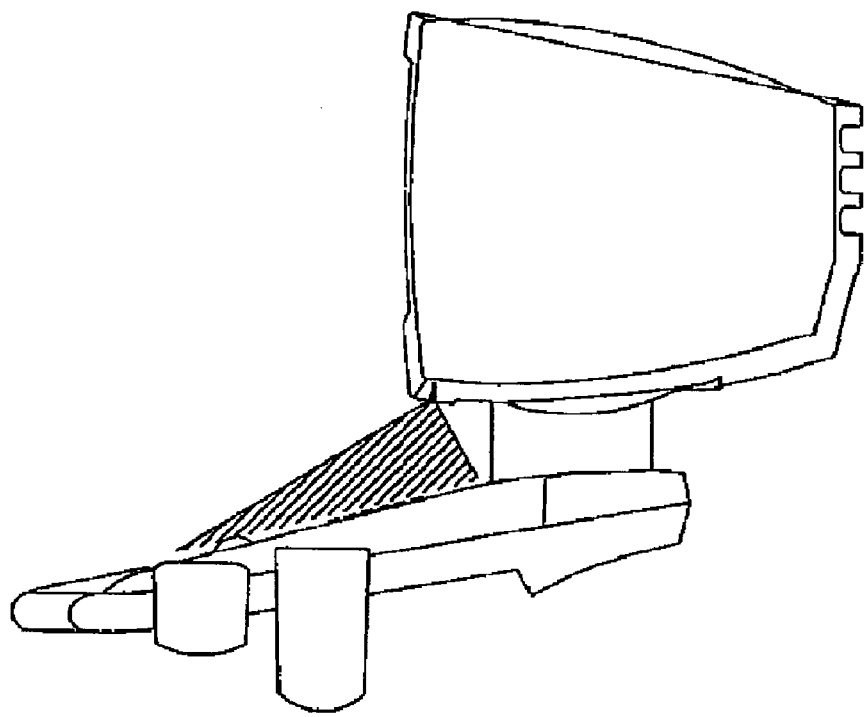
FIG. 3 is a side view of the first embodiment of the task light according to the present invention.

A first embodiment of a task light according to the present invention is shown in FIGS. 1A, 1B, 1C, 2A, 2B, 2C, 3, and 4. FIGS. 1A to 1C, 2A to 2C, and 3 are respectively planar views, front elevation views, and a side view, and a display 1 can be rotated in the horizontal direction to a console 2. FIG. 1A and FIG. 2A show a state where the display 1 is rotated to the right of the console 2. FIG. 1B and FIG. 2B show a state where the display 1 is rotated to the center of the console 2. FIG. 1C and FIG. 2C show a state where the display 1 is rotated to the left of the console 2. Lights L2, L1, and L3 are respectively provided in the lower-left, lower-center, and lower-right of the display 1 such that the entire console 2 is illuminated when the display 1 is located at the right, center, and the left of the console 2. The type of light used in the present invention is irrelevant as long as the light functions to illuminate the entire console. Pilot lamps (miniature bulbs), filament lamps, fluorescent lamps, incandescent lamps, light emitting diodes (LED), and the like can be implemented. In addition, all types of display, such as cathode-ray tube (CRT), liquid crystal, and plasma, apply.

Figure 4:
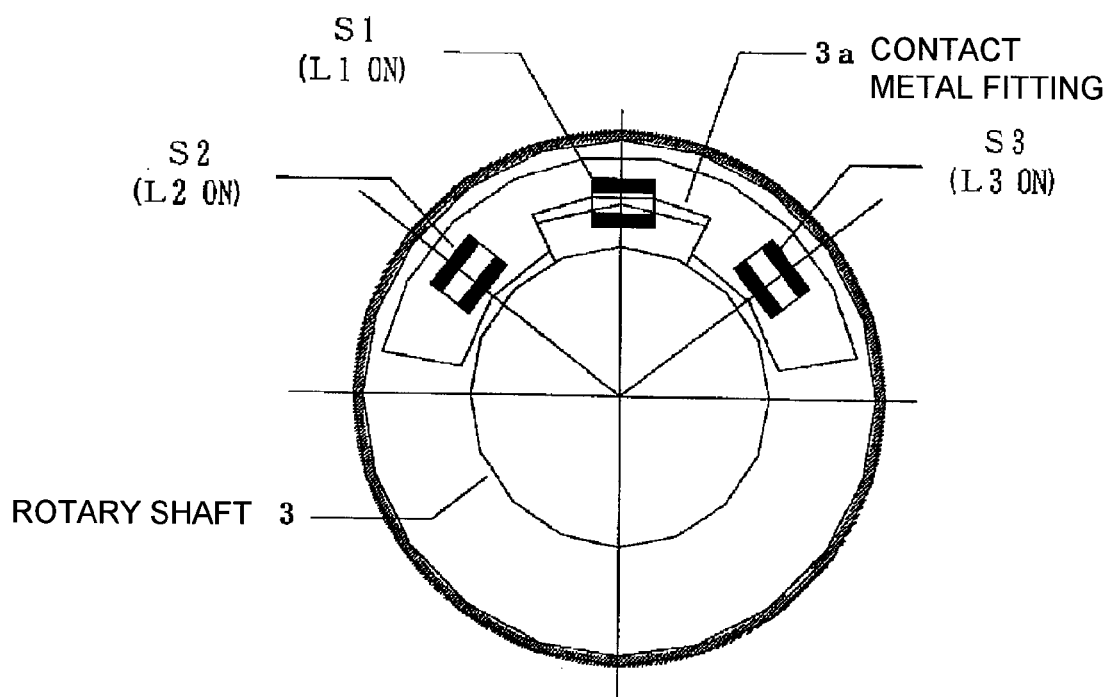
FIG. 4 is a configuration diagram of a display position detection means of the first embodiment of the task light according to the present invention.

FIG. 4 shows a display position detection means provided in a rotary shaft 3 of the display 1. In this example, sensors S2, S1, and S3, where two mutually opposing conductive members are spaced apart, and a contact metal fitting 3a that conducts electricity between the two conductive members of either any one of sensors S2, S1, or S3 are provided near the rotary shaft 3 of the display 1. The sensors S2, S1, and S3 and the contact metal fitting 3a are provided to correspond when the display 1 is located at the right, center, and left of the console 2.

FIG. 4 shows a state where the display 1 is located at the center of the console 2 and the contact metal fitting 3a is located between the conductive members of sensor S1. At this time, configuration is made such that a detection signal of the sensor S1 is turned ON. Therefore, when the display 1 is located at the center of the console 2, as shown in FIG. 1B and FIG. 2B, the detection signal of the sensor S1 is turned ON, the light L1 in the center of the display 1 is lit, and the light L1 can illuminate the entire console 2. In addition, when the display 1 is located at the right of the console 2, as shown in FIG. 1A and FIG. 2A, the detection signal of the sensor S2 is turned ON, the light L2 on the left-side of the display 1 is lit, and the light L2 can illuminate the entire console 2. In addition, when the display 1 is located at the left of the console 2, as shown in FIG. 1C and FIG. 2C, the detection signal of the sensor S3 is turned ON, the light L3 on the right-side of the display 1 is lit, and the light L3 can illuminate the entire console 2.

A photointerrupter in which a light emitting element and a light receiving element oppose can be used as the sensors S2, S1 and S3. In addition, an interrupt member that blocks the light path between the light emitting element and the light receiving element in sensors S2, S1, and S3 can be used in place of the contact metal fitting 3a.

Second Embodiment

Figure 5:
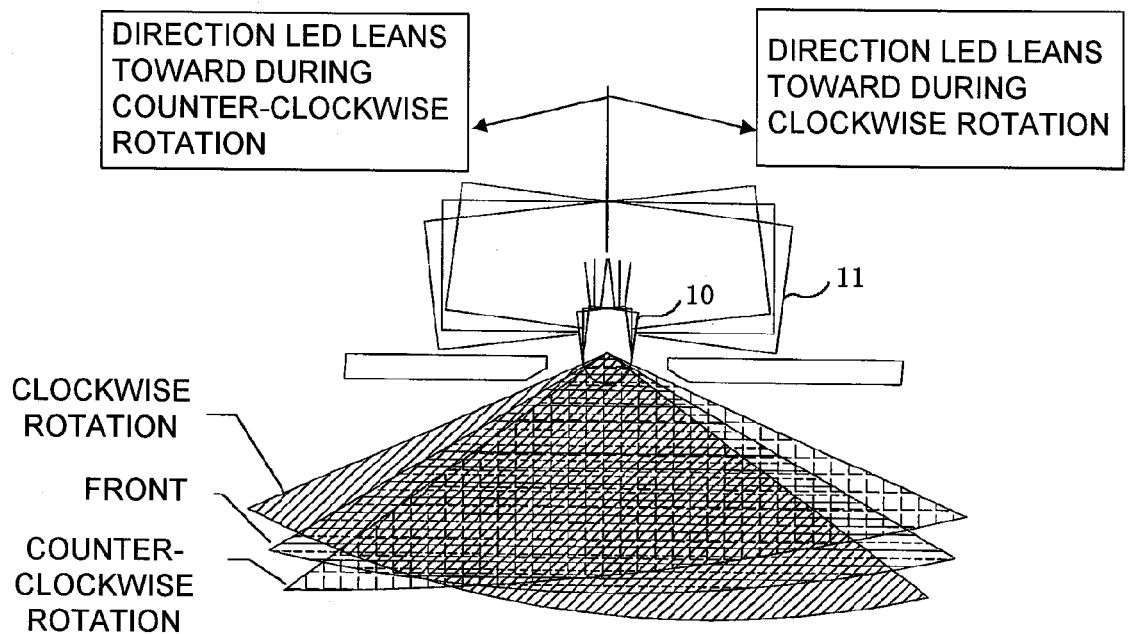
FIG. 5 is a front elevation view of a second embodiment of the task light according to the present invention.
Figure 6A:
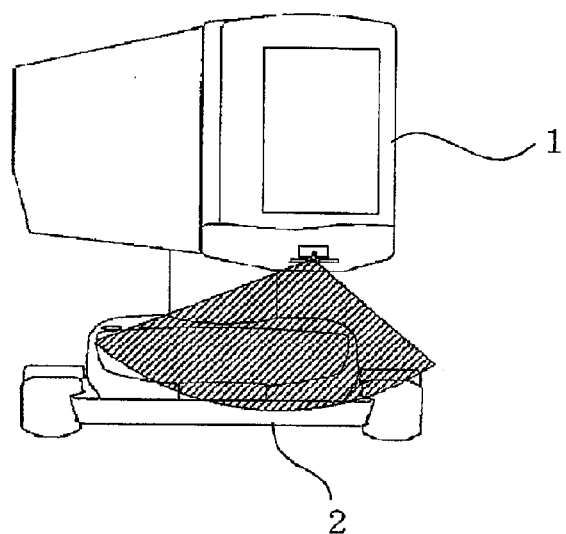
FIG. 6A is a front elevation view of the second embodiment of the task light according to the present invention, showing a state where the display is rotated to the right of the console.
Figure 6B:
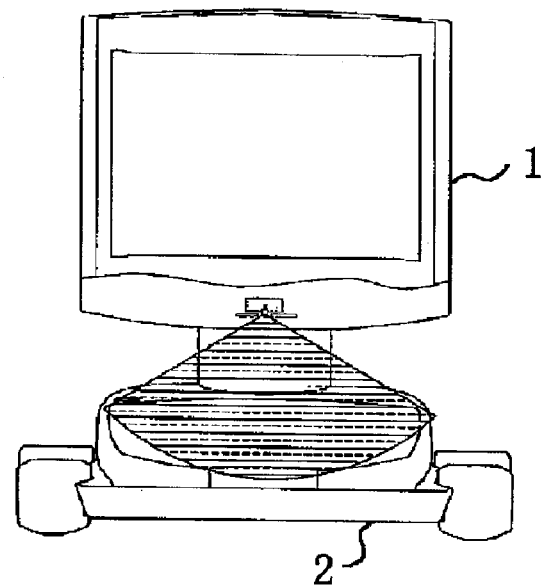
FIG. 6B is a front elevation view of the second embodiment of the task light according to the present invention, showing a state where the display is rotated to the center of the console.
Figure 6C:
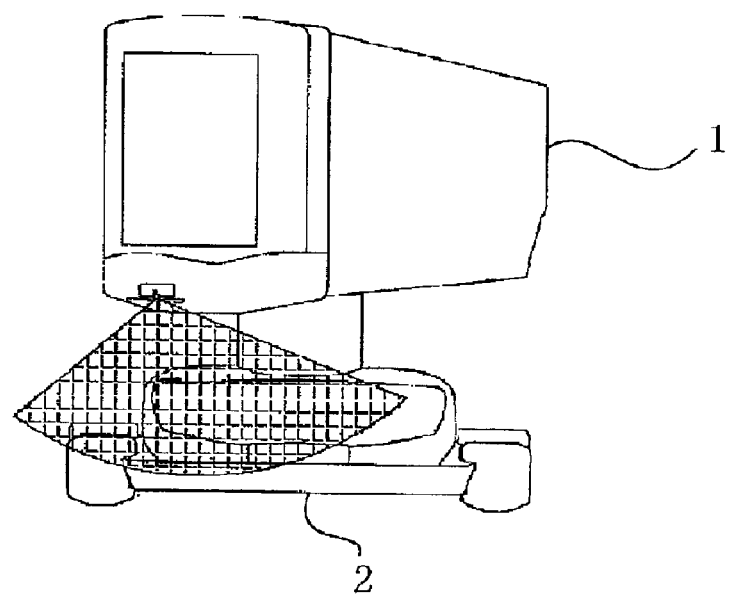
FIG. 6C is a front elevation view of the second embodiment of the task light according to the present invention, showing a state where the display is rotated to the left of the console.

A second embodiment of the task light according to the present invention is shown in FIGS. 5, 6A, 6B, and 6C. In FIG. 5, an LED 10 that is the illumination means is supported by a support member 11, and the support member 11 (and the LED 10) is provided in the center of the display 1, as shown in FIGS. 6A, 6B, and 6C, such as to rotate in correspondence to the rotation of the display 1. The LED 10 rotates to the left when the display 1 is located at the right of the console 2 and illuminates the entire console 2, as shown in FIG. 6A. The LED 10 is located at the center when the display 1 is located at the center of the console 2 and illuminates the entire console 2, as shown in FIG. 6B. The LED 10 located at the right when the display 1 is located at the left of the console 2 and illuminates the entire console 2, as shown in FIG. 6C.

According to the second embodiment, the LED 10 can consistently illuminate the entire console 2 by the rotation of the LED 10 according to the rotational angle of the display 1.

As an LED 10 rotating means, a rotating mechanism that rotates the LED 10 according to the rotational angle of the display 1 can be provided, or rotation can be actualized by an LED rotating motor and a display 1 rotational angle detection sensor.

Third Embodiment

Figure 7:
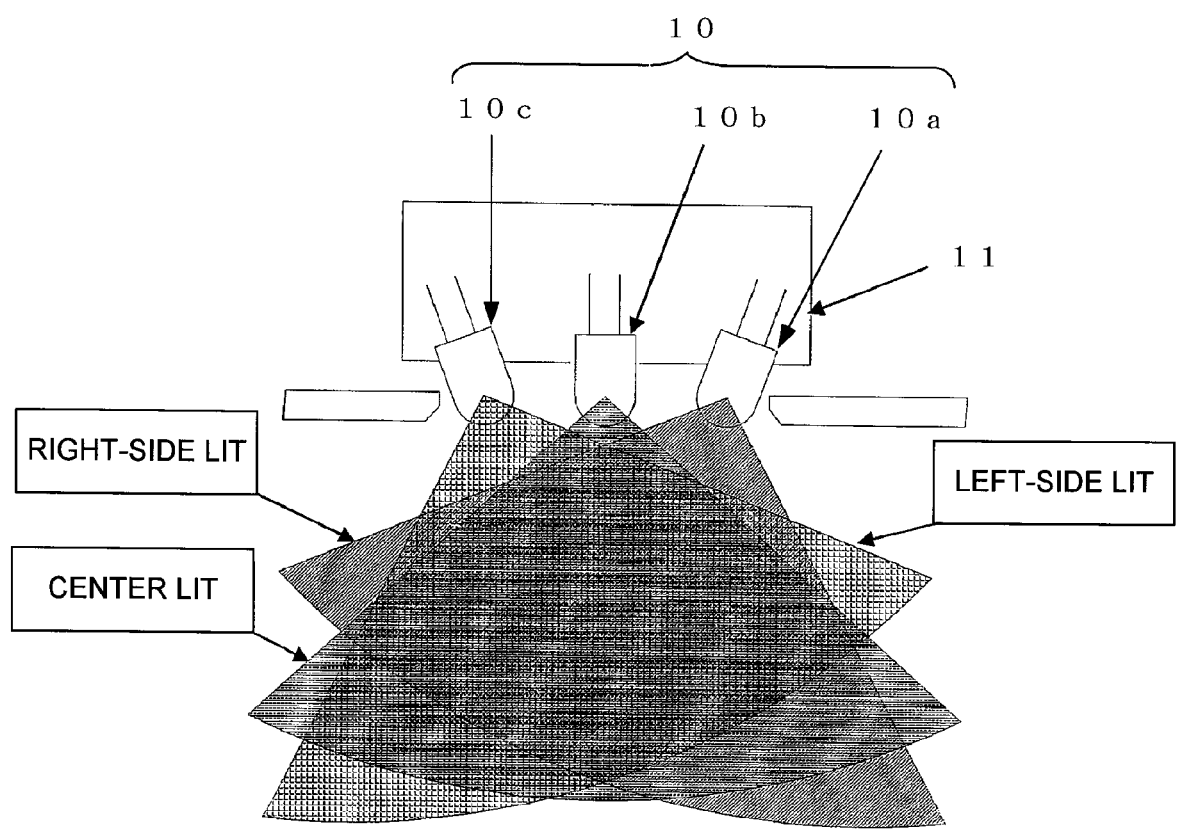
FIG. 7 is a configuration diagram of a third embodiment of the task light according to the present invention.
Figure 8A:
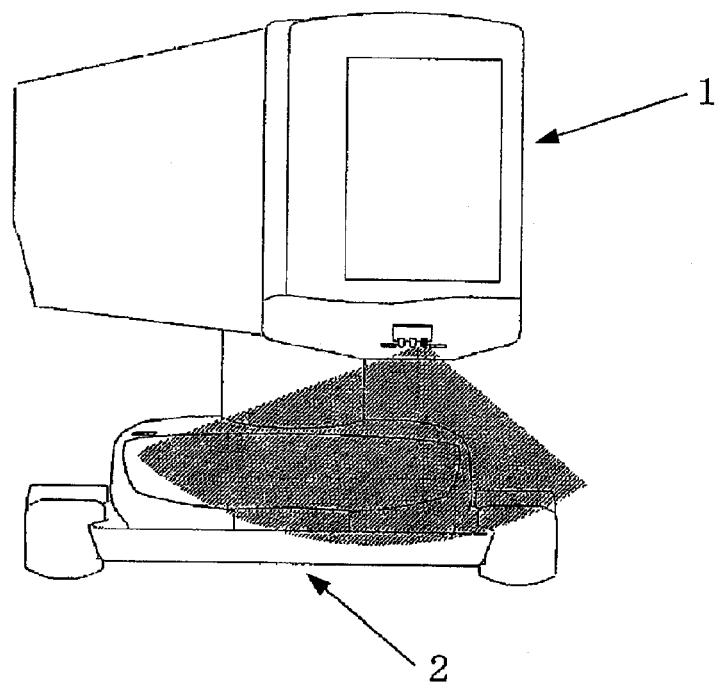
FIG. 8A is a front elevation view of the third embodiment of the task light according to the present invention, showing a state where the display is rotated to the right of the console.
Figure 8B:
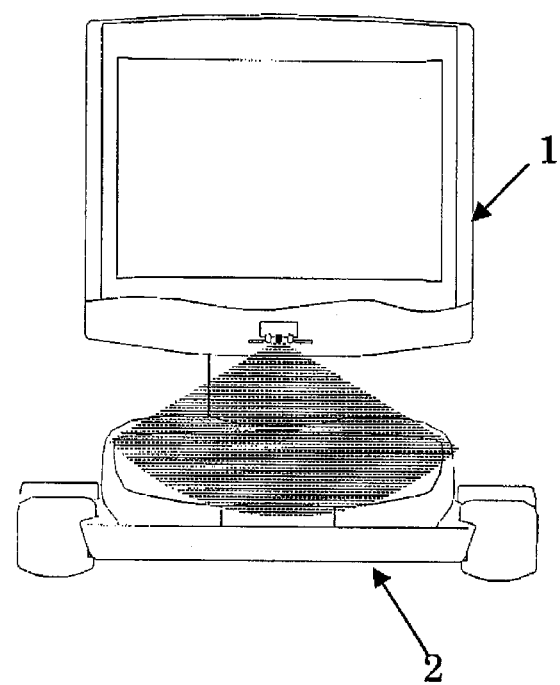
FIG. 8B is a front elevation view of the third embodiment of the task light according to the present invention, showing a state where the display is rotated to the center of the console.
Figure 8C:
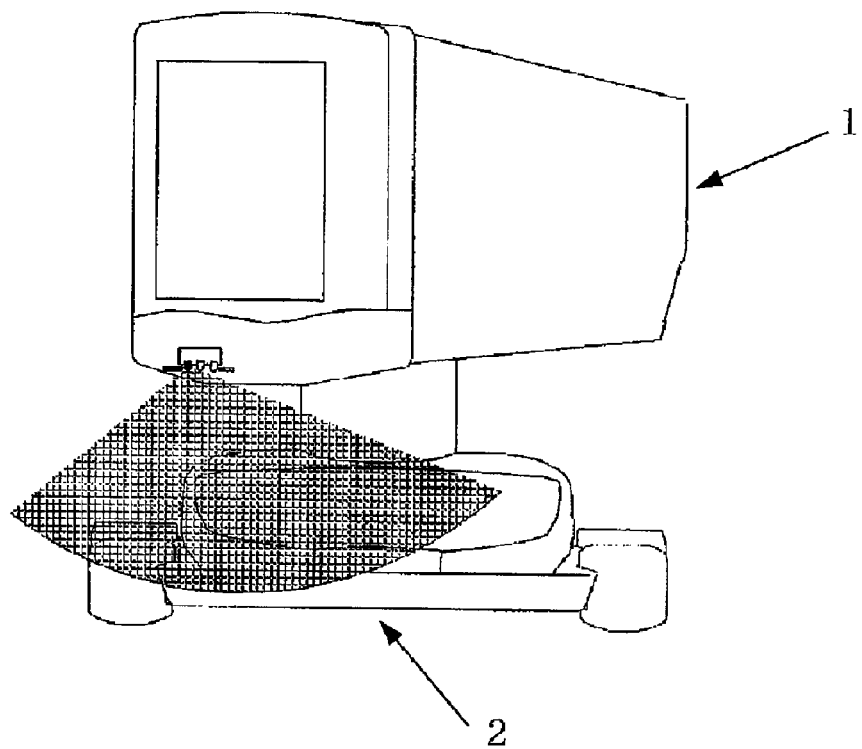
FIG. 8C is a front elevation view of the third embodiment of the task light according to the present invention, showing a state where the display is rotated to the left of the console.

A third embodiment of the task light according to the present invention is shown in FIGS. 7, 8A, 8B, and 8C. In FIG. 7, the LED 10 is provided on the left-side, center, and right-side of the support member 11. The LED 10 illuminates the entire console 2 with an LED 10a on the right-side when the relative position of the display 1 to the console 2 is located at the right, as shown in FIG. 8A. The LED 10 illuminates the entire console 2 with an LED 10b in the center when the relative position of the display 1 to the console 2 is located at the center, as shown in FIG. 8B. The LED 10 illuminates the entire console 2 with an LED 10c on the left-side when the relative position of the display 1 to the console 2 is located at the left, as shown in FIG. 8C.

According to the third embodiment, in comparison to the method of rotating the LED attached to the support member in the second embodiment, the entire console 2 can be illuminated with a simpler structure by fixing the LED 10. In addition, in the configuration for rotating the console 2, the relative position to the display 1 can be detected and the LED 10 in the suitable position can be lit. Any means that can detect position, such as optical and magnetic systems, can be used as a display 1 and console 2 position detection means.

INDUSTRIAL APPLICABILITY

The present invention can illuminate almost the entire console with a simple structure, even when the display is located at the left or right of the center of the console, and thus, can be used in equipments such as an ultrasonic diagnostic apparatus.

The invention claimed is:

1. A task light comprising: plural illumination means aligned in the horizontal direction at different locations on a display that is rotatable about a vertical axis with respect to a console, the display being operable to present output from the console to a user; a detection means for detecting a rotational position of the display with respect to the console; and a lighting means for selectively lighting at least one of the plural illumination means so as to illuminate approximately the entire console, based on the rotational position of the display detected by the detection means; wherein a first rotational position of the display results in illumination of the console using a first illumination means, wherein a second rotational position of the display results in illumination of the console using a second illumination means, and wherein a third rotational position of the display results in illumination of the console with a third illumination means.

2. The task light of claim 1, wherein the detection means has an at least one mutually opposing conductive member adaptable with a contact metal fitting to correspond to the position of the display.

3. A task light comprising: rotatable illumination means provided approximately at the center in the horizontal direction on a display that is rotatable about a non-horizontal axis with respect to a console, wherein the display is operable to present output from the console to a user of the console and the rotatable illumination means is rotatable relative to the display; and a rotating means for rotating the illumination means relative to the display so as to illuminate approximately the entire console when the display is rotated to a plurality of different positions, said rotating of the illumination means being based on the rotational position of the display with respect to the console detected by a detection means.

4. The task light of claim 3, wherein the illumination means are rotatable about a horizontal axis that is respect to the console and perpendicular to a viewing panel of the display.

5. The task light of claim 3, wherein the non-horizontal axis is vertical with respect to the console.

* * * * *